(12) United States Patent  (10) Patent No.: US 7,482,537 B1
Shotey et al.  (45) Date of Patent: Jan. 27, 2009

(54) CONVERTIBLE OUTLET COVER

(76) Inventors: Michael J. Shotey, 10226 Ritornia Ave., Las Vegas, NV (US) 89135; Marcus J. Shotey, 9677 E. Gold Dust Ave., Scottsdale, AZ (US) 85258

( * ) Notice: Subject to any disclaimer, the term of this patent is extended or adjusted under 35 U.S.C. 154(b) by 3 days.

(21) Appl. No.: 11/777,985

(22) Filed: Jul. 13, 2007

Related U.S. Application Data

(60) Provisional application No. 60/807,303, filed on Jul. 13, 2006.

(51) Int. Cl.
*H02G 3/14* (2006.01)
(52) U.S. Cl. .................... 174/67; 174/66; 220/241; 439/538; 33/528
(58) Field of Classification Search ............ 174/66, 174/67; 220/241, 242; 33/528; 439/553, 439/538
See application file for complete search history.

(56) References Cited

U.S. PATENT DOCUMENTS 6,342,676 B1 * 1/2002 Ha ........................ 174/67
6,372,987 B1 * 4/2002 Ha ........................ 174/67
6,761,582 B1 * 7/2004 Shotey et al. ............ 439/536
6,796,814 B1 * 9/2004 Handschke .............. 439/142
7,186,917 B1 * 3/2007 Van De Wiele, Jr. ........ 174/66
7,230,182 B1 * 6/2007 Gates ..................... 174/66

* cited by examiner

*Primary Examiner*—Dhiru R Patel
(74) *Attorney, Agent, or Firm*—Booth Udall, PLC

(57) ABSTRACT

Implementations of an electrical device cover may include a base unit having an electrical device aperture therein configured to accommodate a face of a first electrical device and at least one box mounting screw aperture therein. A portion of the base unit may be configured to cover a portion of the face of the first electrical device of a first electrical device type when the electrical device cover is installed over the first electrical device and may be configured to expose a face of a second electrical device of a second electrical device type different from the first electrical device type when the electrical device cover is installed over the second electrical device.

19 Claims, 8 Drawing Sheets

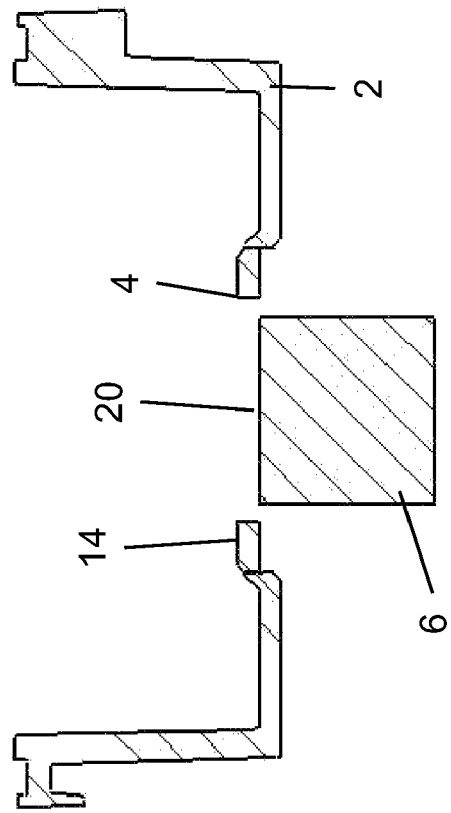
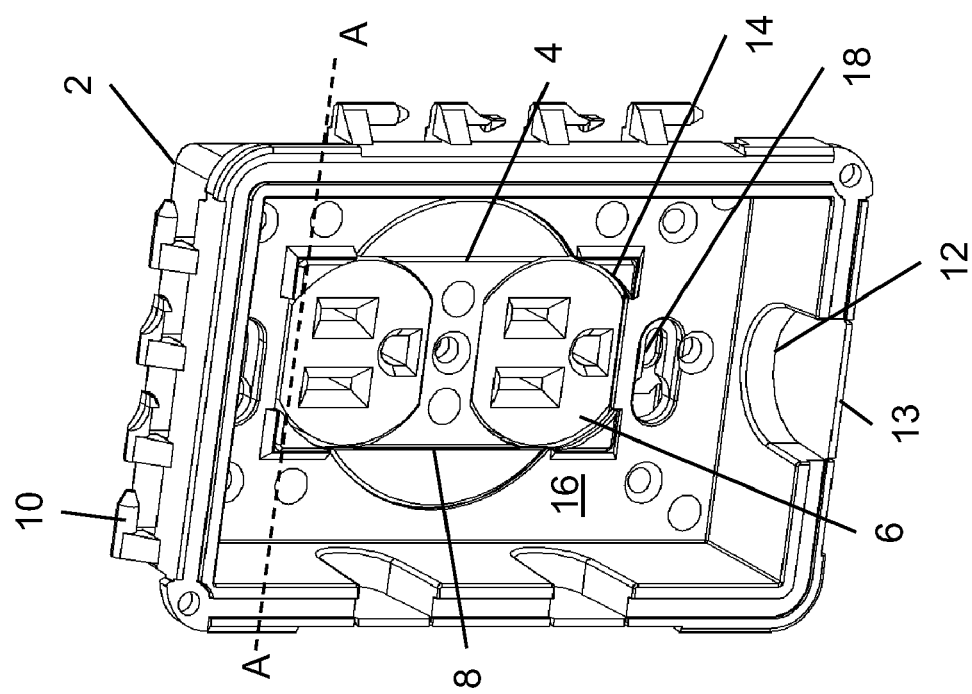

CONVERTIBLE OUTLET COVER

CROSS REFERENCE TO RELATED APPLICATIONS

This document claims the benefit of the filing date of U.S. Provisional Patent Application 60/807,303 entitled "Convertible Outlet Cover" to Shotey, et al. which was filed on Jul. 13, 2006, the disclosure of which is hereby incorporated entirely herein by reference.

BACKGROUND

1. Technical Field

Aspects of this document relate generally to covers for electrical devices.

2. Background Art

Electrical outlet covers are conventionally used to protect electrical devices from water and other contaminants, prevent access to electrical wires, and/or provide a particular decorative look to an installed electrical outlet. Conventional electrical outlet covers may include a variety of components, such as bases and lids, and may be mounted in a variety of orientations, such as horizontal or vertical. Electrical outlet covers may be used in a variety of locations, including interior/exterior walls or recessed within a wall or other structure.

SUMMARY

A first implementation of an electrical device cover may include a base unit having an electrical device aperture therein configured to accommodate a face of a first electrical device and at least one box mounting screw aperture therein. A portion of the base unit may be configured to cover a portion of the face of the first electrical device of a first electrical device type when the electrical device cover is installed over the first electrical device and may be configured to expose a face of a second electrical device of a second electrical device type different from the first electrical device type when the electrical device cover is installed over the second electrical device.

Particular implementations of an electrical device cover may include one, some, or all of the following:

The base unit may include a front surface and an insert coupled to the base unit. The insert may have an electrical device mounting screw aperture therethrough and at least two flexible insert mounting projections each extending from a side of the insert. The at least two flexible insert mounting projections may extend through the base unit and rest against the front surface of the base unit.

The portion of the base unit configured to cover a portion of the face of the first electrical device of the first electrical device type may be flexible.

The portion of the base unit configured to cover a portion of the face of the first electrical device of the first electrical device type may be a projection.

A second implementation of an electrical device cover may include a base unit having a front surface, the front surface having an electrical device aperture therein configured to accommodate the face of a first electrical device of a first electrical device type and at least one box mounting screw aperture therein. An insert may be coupled to the base unit and may include an electrical device mounting screw aperture therethrough. The insert may include at least two flexible insert mounting projections each extending from a side of the insert. The at least two flexible insert mounting projections may extend through the base unit and may rest against the front surface.

Particular implementations of a second electrical device cover implementation may include one, some or all of the following:

A portion of the base unit may be configured to cover a portion of the face of the first electrical device of a first electrical device type when the electrical device cover is installed over the first electrical device and may be configured to expose a face of a second electrical device type different from the first electrical device type when the electrical device cover is installed over the second electrical device.

The portion of the base unit configured to cover a portion of the face of the first electrical device of the first electrical device type may be either flexible or a projection.

First and second implementations of electrical device covers may include one, some, or all of the following:

The at least two flexible insert mounting projections may extend through the base unit at the electrical device aperture.

The base unit may further include at least two insert mounting apertures therethrough adjacent to the electrical device aperture, and the at least two flexible insert mounting projections may extend through the base unit through the at least two insert mounting apertures.

The electrical device cover may further include a lid having at least one lid hinge member and the base unit may further include at least one base unit hinge member. The lid and the base unit may be hingedly coupled together through the at least one lid hinge member and the at least one base hinge member.

The base unit may include at least one removable tab, where removal of the at least one removable tab may convert the electrical device aperture in the cover plate to accommodate a face of a third electrical device of a third electrical device type different from the first and second electrical device types.

The base unit may further include at least one adapter plate, where the adapter plate converts the electrical device aperture to accommodate a face of a third electrical device of a third electrical device type different from the first and second electrical device types.

The adapter plate may include at least one removable tab, where removal of the at least one removable tab converts the electrical device aperture to accommodate a face of a third electrical device of a third electrical device type different from the first and second electrical device types.

First and second implementations of an electrical device cover may include a method of installation that includes the steps of providing a base unit comprising an electrical device aperture therein, the electrical device aperture configured to expose a face of a first electrical device. The method may further include the steps of inserting the base unit over a second electrical device of a second electrical device type different from the first electrical device type and flexibly conforming a portion of the base unit over a portion of the face of the second electrical device.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 1A is a front perspective view of an implementation of an electrical device cover installed over a duplex receptacle with the lid removed showing sectional line A;

FIG. 1B is a cross section view along the section line A of the electrical device cover illustrated in FIG. 1A;

DESCRIPTION

Figures 2A, 2B:
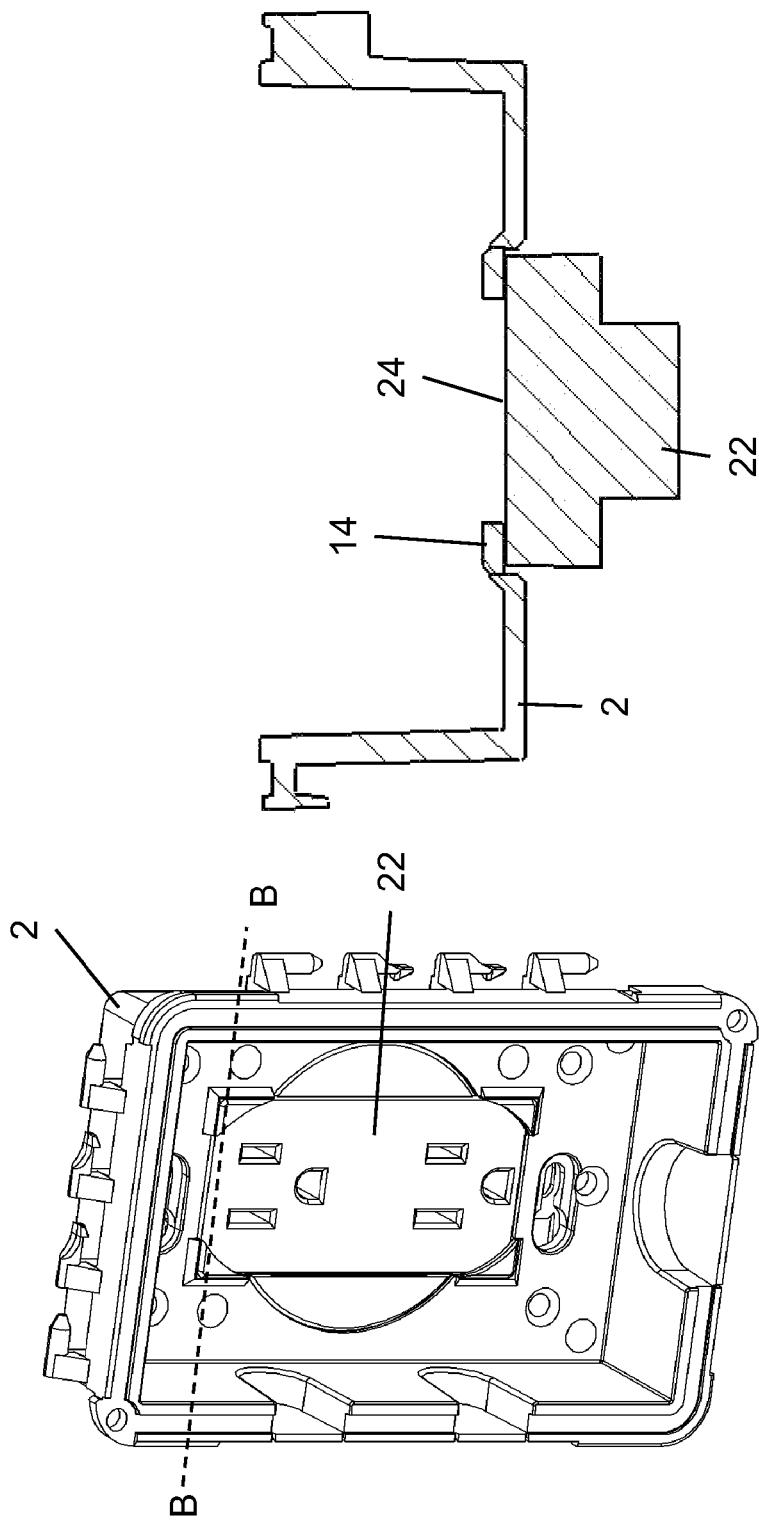
FIG. 2A is a front perspective view of the implementation of an electrical device cover illustrated in FIG. 1A installed over a ground fault current interrupter (GFCI) receptacle with the lid removed showing sectional line B.
FIG. 2B is a cross section view along the section line B of the electrical device cover illustrated in FIG. 2A.

This disclosure, its aspects and implementations, are not limited to the specific components or assembly procedures disclosed herein. Many additional components and assembly procedures known in the art consistent with the intended electrical device cover and/or assembly procedures for an electrical device cover will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such electrical device covers and implementing components, consistent with the intended operation.

Referring to FIG. 1A, an implementation of a base unit 2 of an electrical device cover is illustrated. The base unit 2 may include an electrical device aperture 4 configured to receive the face of an electrical receptacle and at least one box mounting screw aperture 18. As illustrated, the electrical device aperture 4 of the implementation of a base unit 2 illustrated in FIG. 1A has been configured to receive a duplex receptacle 6 through an insert 8 coupled to the base unit 2. Particular implementations of the base unit 2 may include at least one base unit hinge member 10 and at least one cord port 12 in a surface of the base unit 2, though neither hinge members nor cord ports are required for every implementation. For example, the side walls and hinge members shown in FIG. 1A may be removed so that the base is substantially planar with the addition of the features and principles taught herein to enable the base to be mountable on multiple different electrical device types without permanent or other significant modification.

The at least one base unit hinge member 10 may be configured to correspond to at least one lid hinge member on a lid to allow the lid and the base unit 2 to be hingedly coupled together. Relevant teachings regarding the structure, use, and materials of base and lid hinge members and lids may be found in U.S. Pat. No. 5,763,831 to Shotey, et al. entitled "Universal cover plate, cover plate assembly, and related methods" issued Jun. 9, 1998, the disclosure of which is hereby incorporated herein by reference. Those of ordinary skill in the art will readily be able to understand how a lid may be adapted to work with the base shown in the Figures shown herein for implementations where hinges are used. In particular implementations, the at least one cord port 12 may be open or closed through a feature designed to prevent ingress of water and other contaminants. The cord port 12 may also include at least one removable tab 13, the removal of which may allow a cord to extend out of the cord port when a plug is inserted into an electrical device within the electrical device cover.

As illustrated in FIG. 1A, the base unit 2 may include portions that form projections 14 elevated above a top surface 16 of the base unit 2. Referring to the cross section view along the sectional line A of FIG. 1A shown in FIG. 1B, these projections 14 may be raised above the level of the face 20 of the duplex receptacle 6, and may or may not create a gap between the corners of the electrical device aperture 4 and the face 20 of the duplex receptacle 6. FIG. 2A illustrates the base unit 2 of FIGS. 1A and 1B installed over a ground fault current interrupter (GFCI) receptacle 22. As illustrated in the cross section view along sectional line B in FIG. 2B, the projections 14 of the base unit 2 may rest against the face 24 of the GFCI receptacle 22 and allow the base 2 to accommodate the face 24 of the GFCI receptacle 22 without requiring permanent or other modification of the base unit 2 (such as the removal of removable tabs or other portions of the base unit). The use of the projections 14 may allow implementations of base units 2 to be interchangeably installed over both duplex, GFCI, and decora-style receptacle covers without requiring the removal of corner tabs as was done in conventional base unit designs. In other implementations, the projections 14 may be removable if desired by a user or may be required to be removed depending upon the receptacle type over which the base unit 2 is being installed.

Figure 3A:
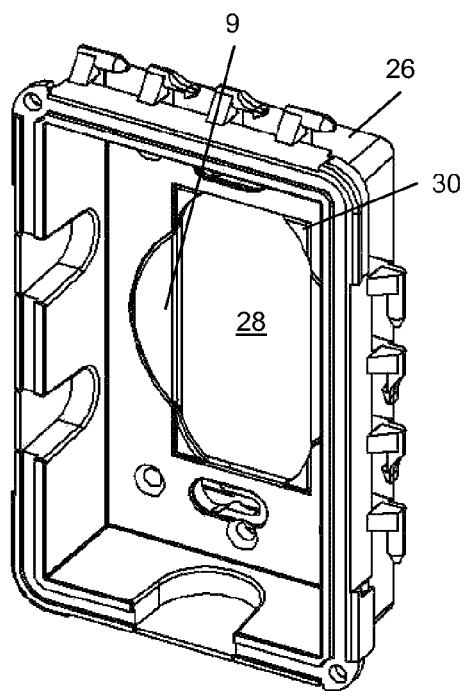
FIG. 3A is a front perspective view of a base unit of another implementation of an electrical device cover with the lid removed.
Figure 3B:
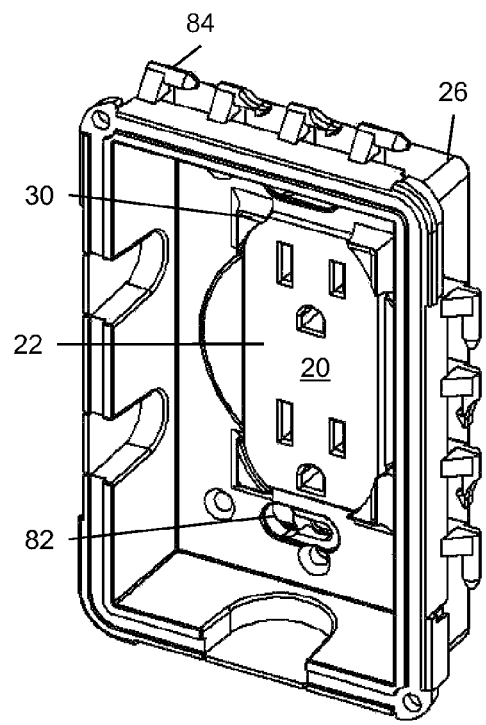
FIG. 3B is a front perspective view of the base unit illustrated in FIG. 3A installed over a GFCI receptacle.

Referring to FIG. 3A, another particular implementation of a base unit 26 is illustrated. Like the implementation illustrated in FIGS. 1A-2B, this implementation of a base unit 26 also includes an electrical device aperture 28. FIG. 3B shows the implementation of a base unit 26 installed over the GFCI receptacle 22 and illustrates that the base unit 26 may include at least one flexible portion 30 that conforms to and covers a portion of the face 20 of the GFCI receptacle 22 by yielding outward as the base unit 26 is installed over the GFCI receptacle 22. The flexible portion 30 may flexibly stretch to allow the face 20 of the GFCI receptacle to fully extend into the electrical device aperture 28. When the base unit 26 is installed over a duplex receptacle, however, the at least one flexible portion 30 may remain unstretched and rest against the side of the face of the duplex receptacle. In some particular implementations, this flexible portion may substantially eliminate gaps between the edge of the electrical device aperture 28 and the duplex receptacle.

Figure 4B:
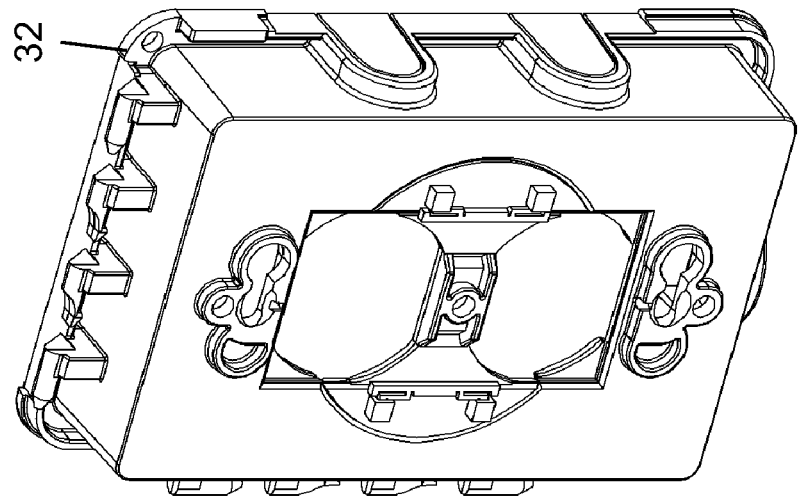
FIG. 4B is a rear perspective view of the base unit and insert illustrated in FIG. 4A coupled together.
Figure 4A:
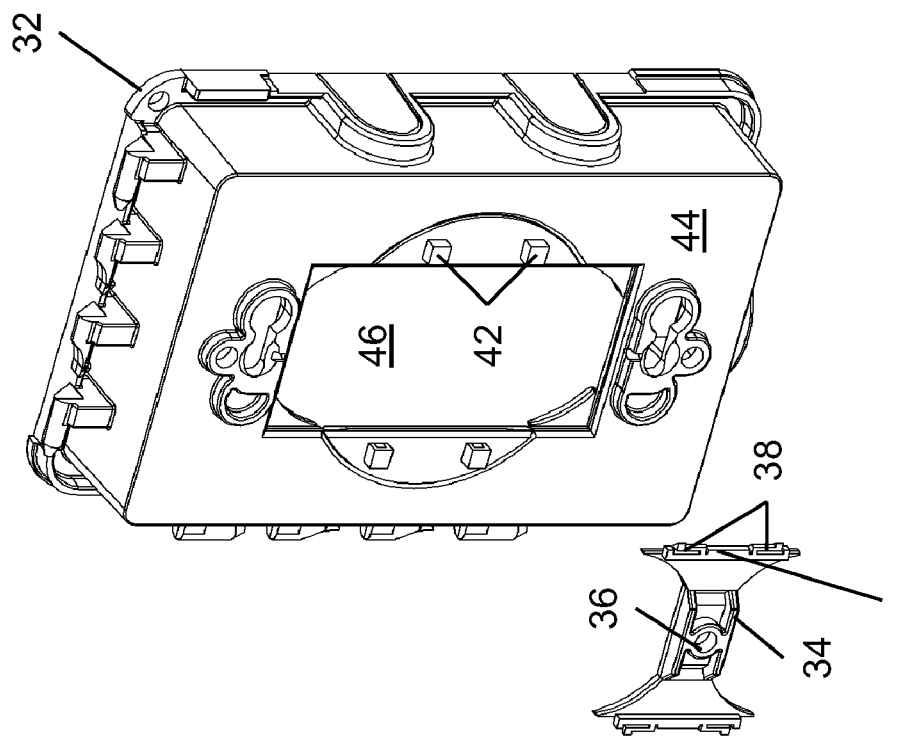
FIG. 4A is a rear exploded perspective view of a implementation of a base unit and an insert.

Referring to FIG. 4A, another particular implementation of a base unit 32 is illustrated. The base unit 32 may include an insert 34 with an electrical device mounting aperture 36 therethrough and at least two flexible insert mounting prongs 38 extending from a side 40 of the insert 34. Particular implementations of a base unit 32, as illustrated in FIG. 4A, may include at least two mounting prong insertion features 42 on a rear surface 44 of the base unit 32. To allow an electrical device aperture 46 in the base unit 32 to accommodate the face of a duplex receptacle, the insert 34 may be coupled to the base unit 32 through coupling the at least two flexible insert mounting prongs 38 with the at least two mounting prong insertion features 42 on the rear surface 44, as illustrated in FIG. 4B. The insert 34 may then be coupled to the duplex receptacle through tightening of an electrical device mounting screw through the electrical device mounting aperture 36.

Figure 5B:
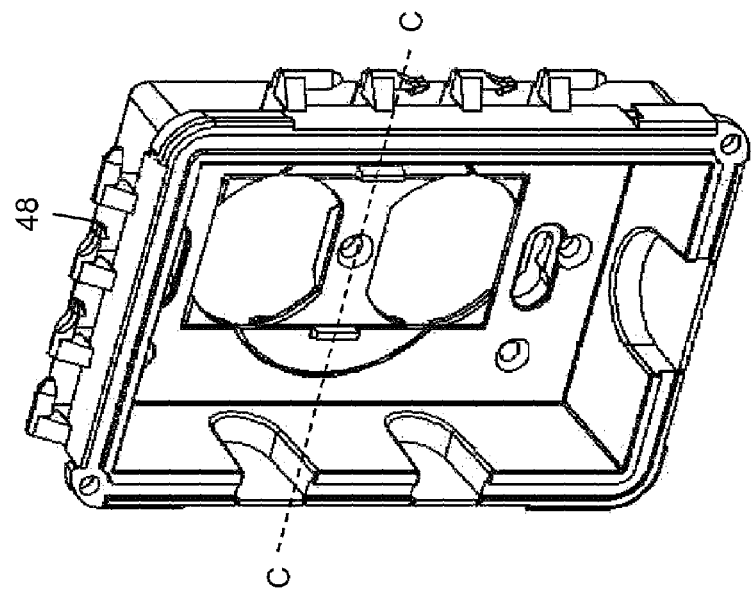
FIG. 5B is a front perspective view of the base unit and insert illustrated in FIG. 5A coupled together showing the sectional line C.
Figure 5A:
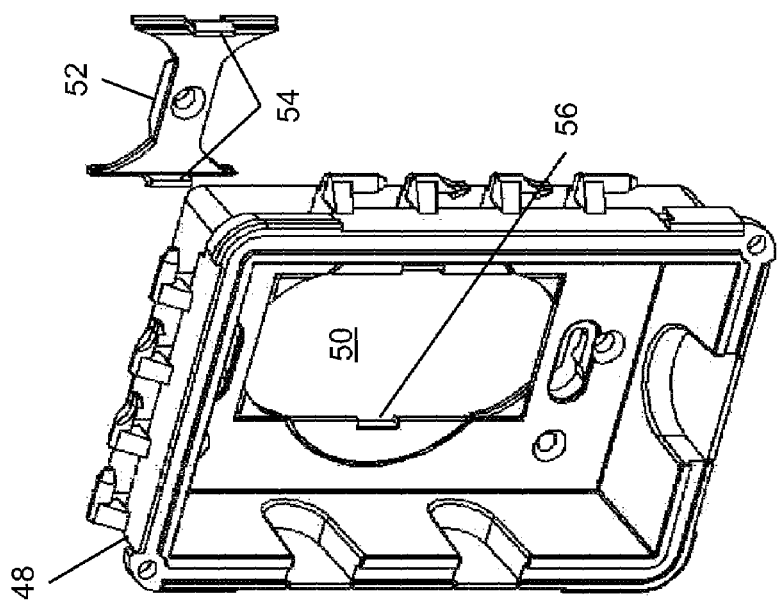
FIG. 5A is a front exploded perspective view of an implementation of a base unit and an insert.
Figure 6:
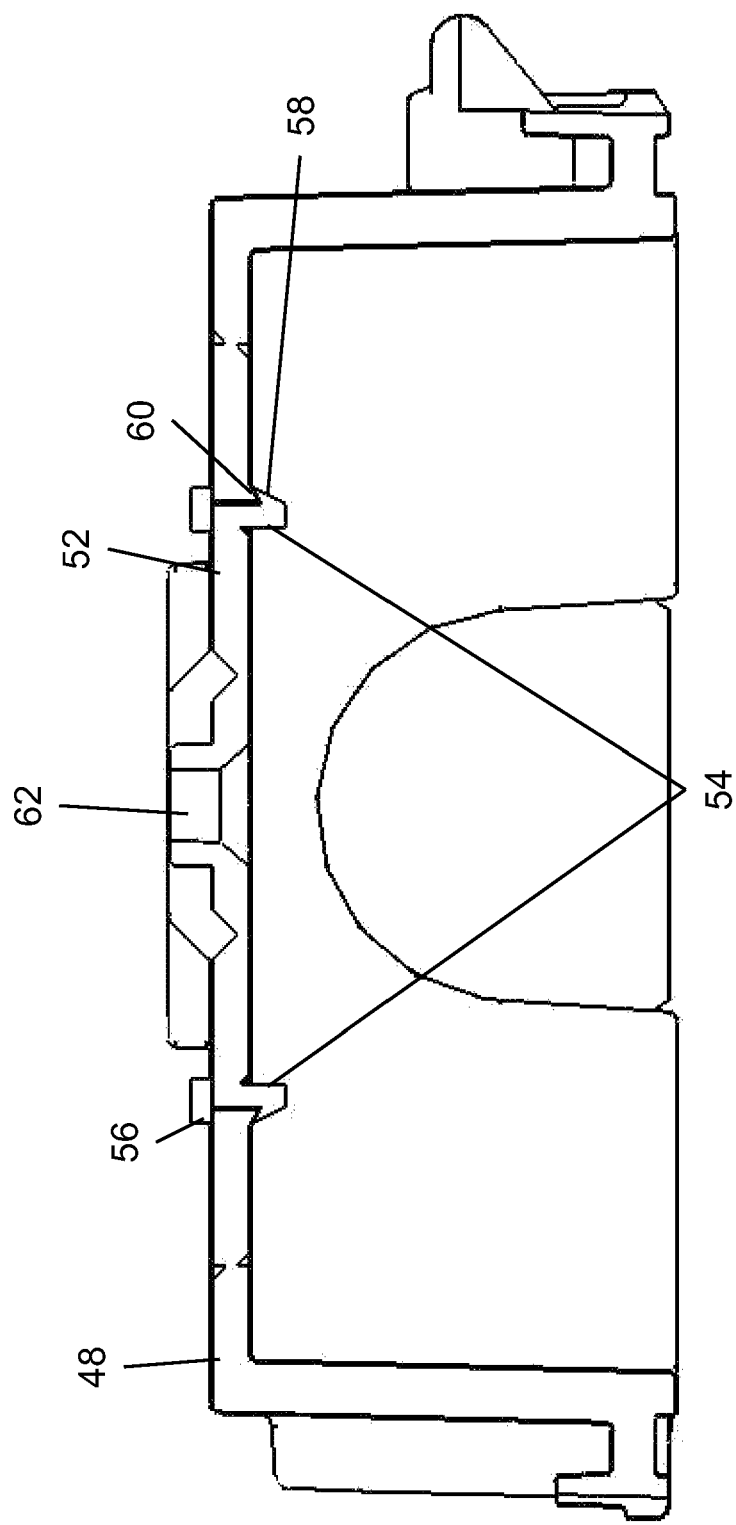
FIG. 6 is a cross section view of the base unit and insert illustrated in FIG. 5A along sectional line C.

FIG. 5A illustrates another particular implementation of a base unit 48 having an electrical device aperture 50 and an insert 52. The insert 52 may include at least two flexible insert mounting prongs 54 that couple at the electrical device aperture 50 along its sides 56. FIG. 5B illustrates the insert 52 coupled at the electrical device aperture 50, configuring the electrical device aperture 50 to accommodate a duplex receptacle. FIG. 6 illustrates a cross section view along sectional line C of the insert 52 coupled to the base unit 48. As illustrated, the at least two flexible insert mounting prongs 54 of particular implementations of an insert 52 may include catches 58 that engage with corresponding ridges 60 on the sides 56 of the electrical device aperture 50. Because the at least two flexible insert mounting prongs 54 may extend through the base unit 48 at the electrical device aperture 50, and the catches 58 engage with the ridges 60, the insert 52 may be able to substantially support a duplex receptacle when coupled with it through the electrical device mounting aperture 62 and substantially reduce the opportunity for the insert 52 to disengage from the base unit 48 under the insertion force of an electrical plug.

Figure 7:
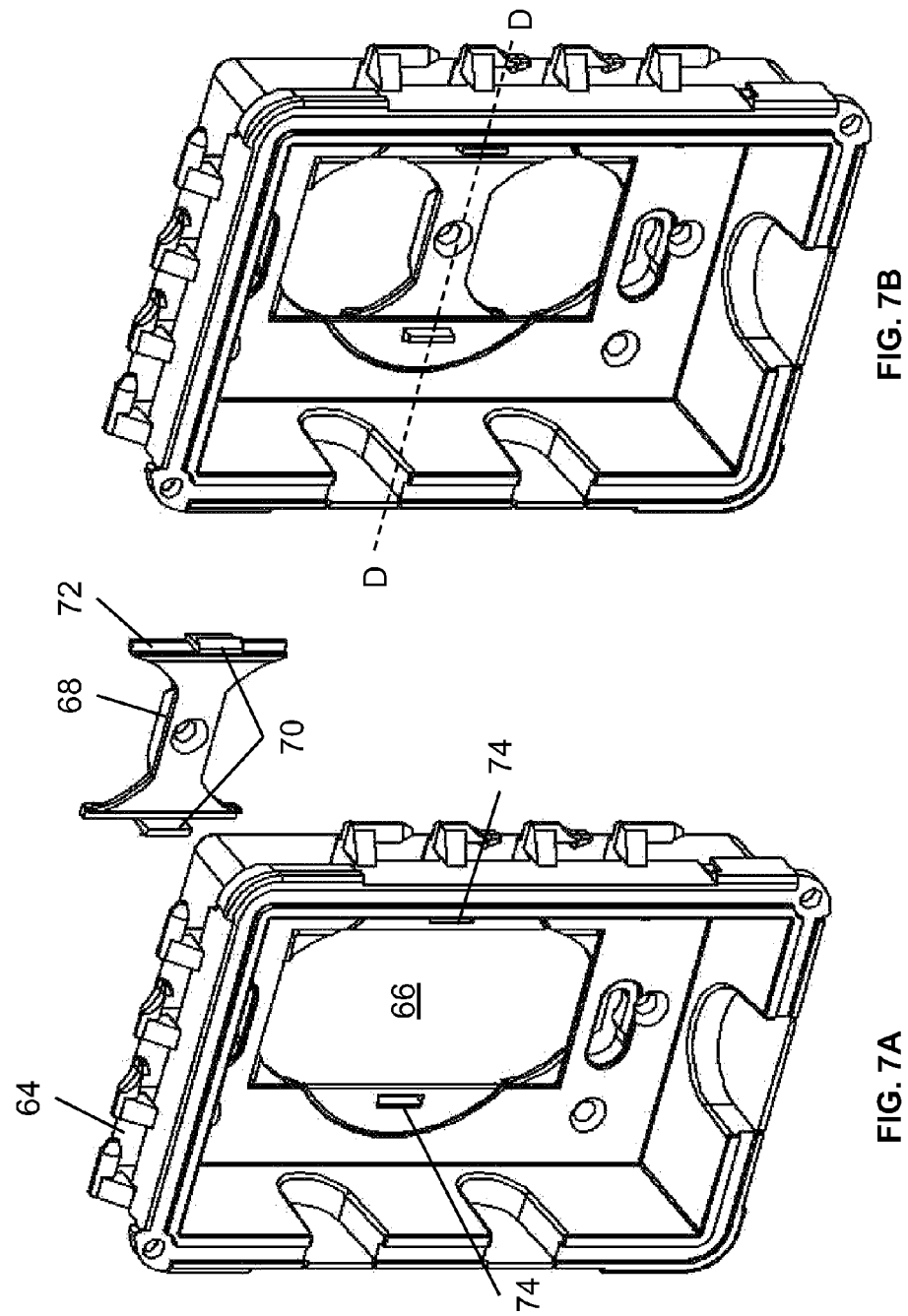
FIG. 7A is a front exploded perspective view of an implementation of a base unit and an insert.
FIG. 7B is a front perspective view of the base unit and insert illustrated in FIG. 7A coupled together showing the sectional line D.
Figure 8:
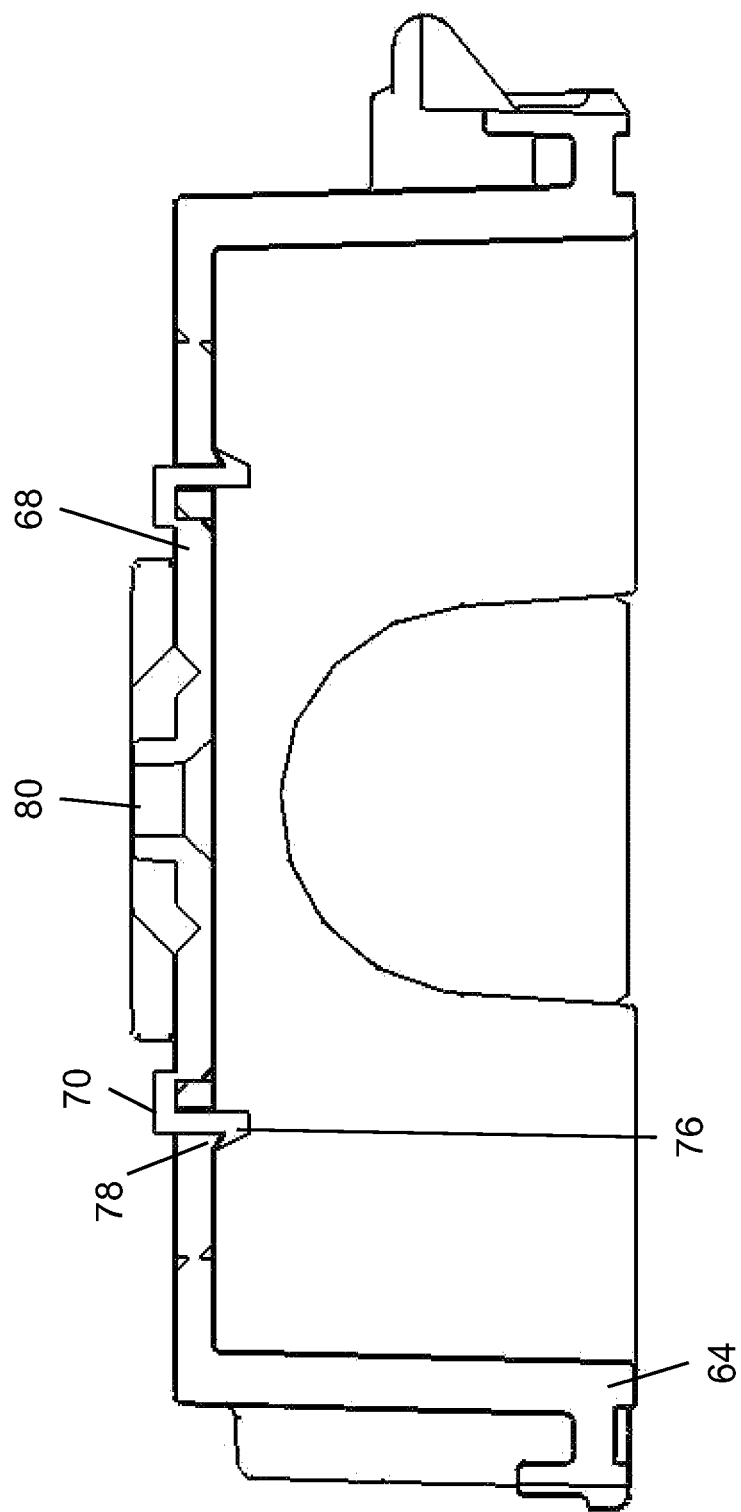
FIG. 8 is a cross section view of the base unit and insert illustrated in FIG. 7A along sectional line D.

Referring to FIGS. 7A and 7B, another particular implementation of a base unit 64 is illustrated. The base unit 64 may include an electrical device aperture 66 and an insert 68 having at least two flexible insert mounting prongs 70 that extend from the sides 72 of the insert 68. The base unit 64 may also include at least two insert mounting apertures 74 therethrough into which the at least two flexible insert mounting prongs 70 may be coupled, as illustrated in FIG. 7B. FIG. 8 illustrates a cross section view along the sectional line D shown in FIG. 7B. As illustrated in FIG. 8, the at least two flexible insert mounting prongs 70 may include catches 76 that engage with corresponding ridges 78 formed on the base unit 64 adjacent to the at least two mounting apertures 74 which may substantially reduce the likelihood that the insert 68 may disengage from the base unit 64 under the force exerted when a plug is inserted into a duplex electrical receptacle coupled to the insert 68 through the electrical device mounting aperture 80.

While the inserts 52 and 68 have been shown in FIGS. 6 and 8 to be located within the electrical device apertures 50, 66 of the base units 48 and 64, in other particular implementations, the inserts 52 and 68 may be located outside of the aperture, such as behind or in front of the plane of the aperture. In addition, particular implementations of base units like those illustrated in FIGS. 4A-8 may include base units that extend flexibly or through projections over the face of a GFCI or decora-style receptacle like those illustrated in FIGS. 1A-3B when the base units are installed over such a receptacle. In cases where base units like those illustrated in FIGS. 4A-8 are installed over a GFCI or decora-style receptacle, the corresponding insert portions may be removed.

Implementations of base units may also include at least one removable tab 9, the removal of which allows the electrical device aperture of the base unit to accommodate the face of an electrical device of a type different from what the base unit was originally configured to accommodate, such as a round receptacle device type (FIG. 3A). In particular implementations, the base units may include at least one adapter plate that may similarly convert the electrical device aperture of the base unit to accommodate a different electrical device type from what the base unit was originally configured to accommodate. In other particular implementations, the adapter plate may include removable tabs, the removal of which serves the aforementioned purposes of converting the electrical device aperture in the base unit. Relevant teachings regarding the structure, use, and materials of removable tabs and adapter plates may be found in U.S. Pat. No. 7,119,277 to Shotey, et al., entitled "Convertible electrical device cover and method for installing same" issued Oct. 10, 2006, the disclosure of which is hereby incorporated herein by reference. Those of ordinary skill in the art will readily understand how to incorporate adapter plates and/or removable tabs into the base of the covers disclosed herein.

Implementations of electrical device covers and implementing components may be constructed of a wide variety of materials. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof. For the exemplary purposes of this disclosure, the base units, adapter plates, and lids may be formed of a plastic material like a polyvinyl chloride (PVC). The flexible portions of the base units may be formed of a rubber, silicon or other flexible and/or conforming material.

Some components defining electrical device cover or electrical device cover assembly implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components. For the exemplary purposes of this disclosure, the base unit may be formed separately through an injection molding process and the flexible portion of the base unit may be formed by selectively applying a rubber material to the edges of the electrical device aperture in an overmolding process.

Use.

Referring to FIG. 3A, a particular implementation of a base unit 26 is illustrated prior to installation over a GFCI or decora-style receptacle 22. The base unit 26 may be installed by inserting the base unit 26 over the face 20 of the GFCI or decora style receptacle 22 and exerting sufficient force to cause the at least one flexible portion 30 of the base unit 26 to yield and conformally cover a portion of the face 20 of the GFCI or decora style receptacle 22. The base unit 26 can then be secured to the electrical box through the at least one box mounting screw aperture 82. A lid can then be coupled to the base unit 26 through the base unit hinge members 84 if desired.

Referring to FIGS. 1A-2B, a particular implementation of a base unit 2 is illustrated. In FIG. 1A, the center insert 4 is inserted so that the openings substantially conform to the size and shape of a duplex receptacle face 6. By removing the center insert 4, the opening is converted to receive the size and shape of a decora or GFCI receptacle face 22.

In each of these examples, it can be seen that the base may be mounted to either of at least two different types of receptacles with only minor modification. In these non-limiting examples, modification was made to a duplex-type receptacle by including the center insert, and a decora or GFCI-type receptacle by simply removing the center insert. The base was configured such that it will fit the shape of the edges of both the duplex-type receptacle and the GFCI-type receptacle. Similarly, it is specifically contemplated that this principle may be adapted to conform to two or more different sizes of round receptacle openings.

It will be understood that implementations are not limited to the specific components disclosed herein, as virtually any components consistent with the intended operation of a method and/or system implementation for and electrical device cover may be utilized. Accordingly, for example, although particular base units and lids may be disclosed, such components may comprise any shape, size, style, type, model, version, class, grade, measurement, concentration, material, weight, quantity, and/or the like consistent with the intended operation of a method and/or system implementation for an electrical device cover may be used.

In places where the description above refers to particular implementations of an electrical device cover, it should be readily apparent that a number of modifications may be made without departing from the spirit thereof and that these implementations may be applied to other electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical device cover comprising:
a base unit comprising an electrical device aperture therein, the electrical device aperture configured to accommodate a face of a first receptacle, the base unit further comprising at least one box mounting screw aperture therein;
wherein a projection of the base unit is configured to cover a portion of the face of the first receptacle of a decora receptacle or ground fault current interrupter (GFCI) receptacle type when the base unit is installed over the first receptacle and is configured to expose a face of a duplex receptacle when the base unit is installed over the duplex receptacle.

2. The electrical device cover of claim 1, wherein the base unit further comprises a front surface and an insert coupled to the base unit, the insert comprising an electrical device mounting screw aperture therethrough and at least two flexible insert mounting projections each extending from a side of the insert, the at least two flexible insert mounting projections extending through the base unit and resting against the front surface.

3. The electrical device cover of claim 2, wherein the at least two flexible insert mounting projections extend through the base unit at the electrical device aperture.

4. The electrical device cover of claim 2, wherein the base unit further comprises at least two insert mounting apertures therethrough adjacent to the electrical device aperture, and the at least two flexible insert mounting projections extend through the base unit through the at least two insert mounting apertures.

5. The electrical device cover of claim 1, wherein the electrical device cover further comprises a lid comprising at least one lid hinge member and the base unit further comprises at least one base unit hinge member and the lid and the base unit are hingedly coupled together through the at least one lid hinge member and the at least one base hinge member.

6. The electrical device cover of claim 1, wherein the base unit further comprises at least one removable tab, wherein removal of the at least one removable tab converts the electrical device aperture in the base unit to accommodate a face of a round receptacle.

7. The electrical device cover of claim 1, wherein the base unit further comprises at least one adapter, wherein the adapter converts the electrical device aperture to accommodate a face of a second receptacle of a type different from the decora receptacle, ground fault current interrupter (GFCI) receptacle and duplex receptacle types.

8. The electrical device cover of claim 7, wherein the adapter further comprises at least one removable tab, wherein removal of the at least one removable tab converts the electrical device aperture to accommodate the face of a third receptacle type different from the decora receptacle, ground fault current interrupter (GFCI) receptacle and duplex receptacle types.

9. The electrical device cover of claim 1, wherein the projection of the base unit configured to cover a portion of the face of the first receptacle is a flexible portion.

10. An electrical device cover comprising:
a base unit comprising a front surface, the front surface comprising an electrical device aperture therein configured to accommodate a face of a first receptacle of a decora receptacle or ground fault current interrupter (GFCI) receptacle type, and at least one box mounting screw aperture therein;
an insert coupled to the base unit, the insert comprising an electrical device mounting screw aperture therethrough and at least two flexible insert mounting prongs each extending from a side of the insert, the at least two flexible insert mounting prongs extending through the base unit and resting against the front surface.

11. The electrical device cover of claim 10, wherein the at least two flexible insert mounting prongs extend through the base unit at the electrical device aperture.

12. The electrical device cover of claim 10, wherein the base unit further comprises at least two insert mounting apertures therethrough adjacent to the electrical device aperture, and the at least two flexible insert mounting prongs extend through the base unit through the at least two insert mounting apertures.

13. The electrical device cover of claim 10, wherein the electrical device cover further comprises a lid comprising at least one lid hinge member and the base unit further comprises at least one base unit hinge member and the lid and the base unit are hingedly coupled together through the at least one lid hinge member and the at least one base hinge member.

14. The electrical device cover of claim 10, wherein the base unit further comprises at least one removable tab, wherein removal of the at least one removable tab converts the electrical device aperture in the cover plate to accommodate the face of an electrical device different from the decora receptacle and ground fault current interrupter (GFCI) receptacle types.

15. The electrical device cover of claim 10, wherein the base unit further comprises at least one adapter plate, wherein the adapter plate converts the electrical device aperture to accommodate a face of a third electrical device of an electrical device different from the decora receptacle and ground fault current interrupter (GFCI) receptacle types.

16. The electrical device cover of claim 15, wherein the adapter plate further comprises at least one removable tab, wherein removal of the at least one removable tab converts the electrical device aperture to accommodate the face of an electrical device different from the decora receptacle and ground fault current interrupter (GFCI) receptacle types.

17. The electrical device cover of claim 10, wherein a projection of the base unit is configured to cover a portion of the face of the first receptacle of a decora receptacle or ground fault current interrupter (GFCI) receptacle type when the base unit is installed over the first receptacle and is configured to expose a face of a duplex receptacle type when the electrical device cover is installed over the duplex receptacle.

18. The electrical device cover of claim 17, wherein the portion of the base unit configured to cover a portion of the face of the first receptacle is either flexible or a projection.

19. A method of installing an electrical device cover comprising:
    providing a base unit comprising an electrical device aperture therein, the electrical device aperture configured to expose a face of a duplex receptacle;
    inserting the base unit over a decora receptacle or a ground fault current interrupter (GFCI) receptacle different from the duplex receptacle; and
    flexibly conforming a projection of the base unit over a portion of the face of the decora receptacle or ground fault current interrupter (GFCI) receptacle.

* * * * *